United States Patent [19]

Gellert

[11] Patent Number: 5,106,291
[45] Date of Patent: Apr. 21, 1992

[54] INJECTION MOLDING APPARATUS WITH HEATED VALVE MEMBER

[76] Inventor: Jobst U. Gellert, 7A Prince Street, Georgetown, Ontario, Canada, L7G 2X1

[21] Appl. No.: 704,222

[22] Filed: May 22, 1991

[51] Int. Cl.⁵ .............................................. B29C 45/23
[52] U.S. Cl. .................... 425/549; 264/328.9; 264/328.15; 425/564; 425/566
[58] Field of Search ............... 425/549, 562, 563, 564, 425/565, 566; 264/328.9, 328.15

[56] References Cited

U.S. PATENT DOCUMENTS

| | | | |
|---|---|---|---|
| 4,125,352 | 11/1978 | Gellert | 425/566 |
| 4,376,244 | 3/1988 | Gellert | 425/566 |
| 4,406,609 | 9/1983 | Gellert | 425/566 |
| 4,768,283 | 9/1988 | Gellert | 425/549 |
| 4,820,147 | 4/1989 | Gellert | 425/549 |
| 4,865,535 | 9/1989 | Gellert | 425/549 |
| 4,979,892 | 12/1990 | Gellert | 425/549 |

Primary Examiner—Tim Heitbrink
Attorney, Agent, or Firm—Dalesman & Company

[57] ABSTRACT

A valve gated injection molding system having an elongated valve member with an integral electrical heating element received in each nozzle to provide additional heat. An actuating mechanism engages the rear end of the valve member to reciprocate it between a withdrawn open position and a forward closed position. The valve member has a head which projects rearwardly from the nozzle. The heating element has an external terminal which extends outwardly from the head through a slot in a mounting sleeve. Thus, access for connection of an electrical lead to the moving terminal is provided between the fixed nozzle and the fixed cylinder of the actuating mechanism.

6 Claims, 3 Drawing Sheets

5,106,291

INJECTION MOLDING APPARATUS WITH HEATED VALVE MEMBER

BACKGROUND OF THE INVENTION

This invention relates generally to injection molding and more particularly to a valve gated injection molding system or apparatus having a heated valve member which is reciprocated by associated actuating mechanism.

As is well known, the thermal characteristics in the area of the gate of an injection molding system are critical to successful operation. In valve gating some materials, it has been found that the existing apparatus does not provide clean cosmetic gating because the forward tip end of the valve pin or member does not fully seat in the gate in the cooled mold. As shown in the applicant's U.S. Pat. Nos. 4,125,352 which issued Nov. 14, 1978 and 4,406,609 which issued Sep. 27, 1983, early attempts were made to overcome this problem by making the valve pins highly conductive to provide more heat at the forward tip end. While these arrangements are satisfactory for some applications, they have the disadvantages that the amount of heat which can be conducted to the forward tip end is limited and they are difficult to manufacture.

It is also well known to provide various stationary components of injection molding systems with integral electrical heating elements. Examples of this are seen in the applicant's U.S. Pat. Nos. 4,376,244 which issued Mar. 8, 1983, 4,820,147 which issued Apr. 11, 1989, 4,865,535 which issued Sep. 12, 1989 and the applicant's Canadian patent application serial no. filed Dec. 19, 1990 entitled "Injection Molding Probe with Varying Heat Profile." However, these previous systems do not have the problem of requiring reliable simultaneous provision of electrical power to numerous valve pins, each of which is reciprocating in a different stationary nozzle in the mold.

SUMMARY OF THE INVENTION

Accordingly, it is an object of the present invention to at least partially overcome the disadvantages of the prior art by providing injection molding apparatus with an elongated valve member having sufficient heat at its forward tip end.

To this end, in one of its aspects, the invention provides valve gated injection molding apparatus having a heated nozzle received in a mold, the nozzle having a forward end, a rear end and a bore which extends longitudinally in alignment with a gate which extends through the mold to a cavity, an elongated valve member with a forward end and a driven rear end, the valve member being received in the bore in the nozzle and driven by actuating mechanism to reciprocate between a retracted open position and a forward closed position wherein the forward end of the valve member is seated in the gate, the actuating mechanism including a piston which is mounted in a cylinder and operatively engages the rear end of the valve member, the nozzle having a melt passage which joins the bore and extends in the bore around the valve member to the gate, with the improvement wherein the valve member has an integral electrically insulated heating element with a forward end and a rear end, the heating element having a longitudinal forward portion and a rear portion, the longitudinal forward portion of the heating element extending centrally in the valve member to the forward end adjacent the forward end of the valve member, the rear portion of the heating element extending outwardly from the forward portion to an external electrical terminal adjacent the rear end of the valve member.

DETAILED DESCRIPTION OF THE DRAWINGS

Figure 1:
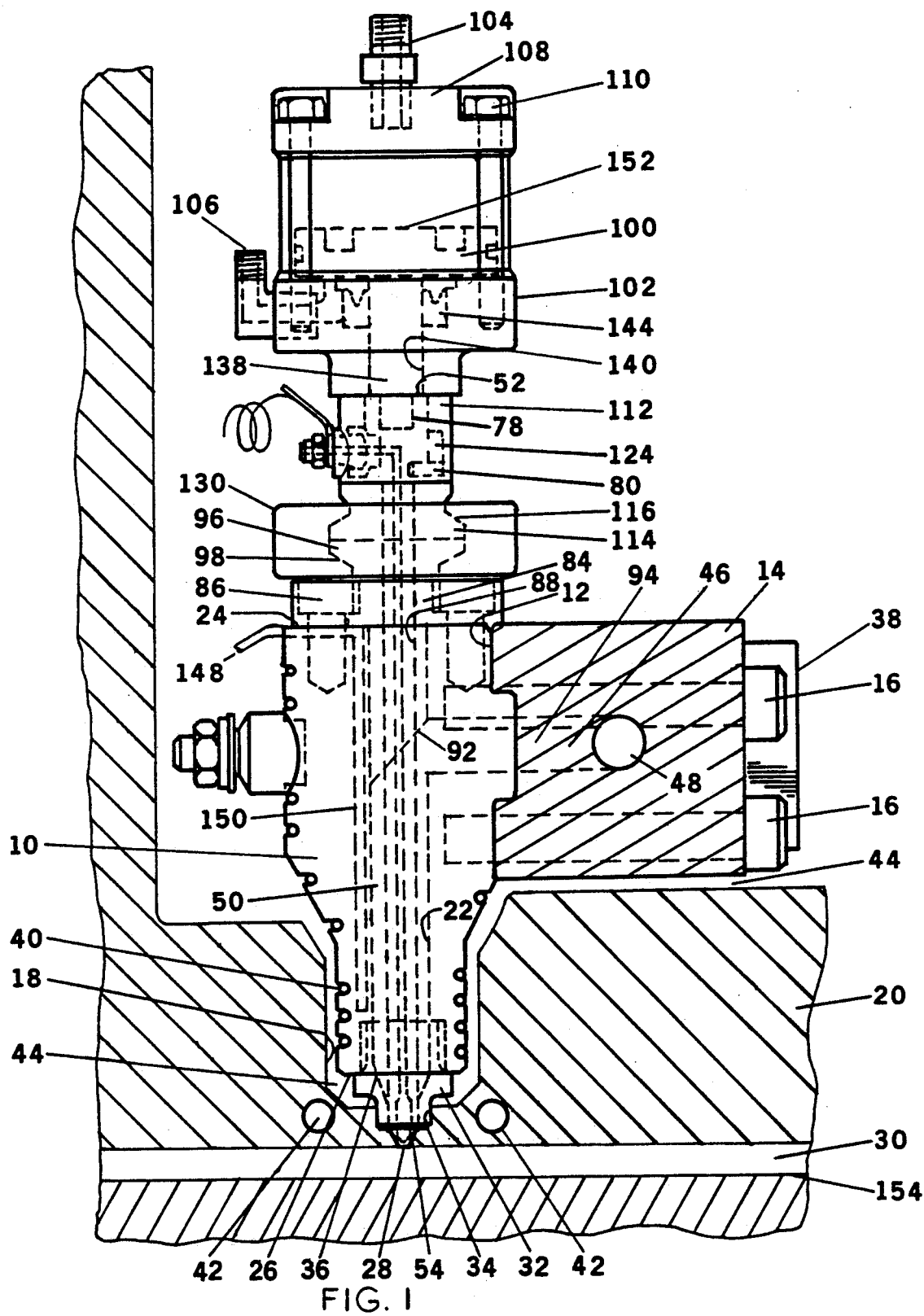
FIG. 1 is a partial sectional view of a portion of an injection molding system according to a preferred embodiment of the invention.

Reference is first made to FIG. 1 which shows a nozzle 10 attached to the side 12 of an elongated steel melt distribution manifold 14 by bolts 16. The nozzle 10 is received in a well 18 in a steel mold 20. The nozzle 10 has a central bore 22 which extends longitudinally from the rear end 24 to the forward end 26 in alignment with a gate 28 extending through the mold 20 to the cavity 30. In this embodiment, the forward end 26 of the nozzle 10 has a removable steel gate insert 3 screwed into it. The gate insert 32 is snugly received in a seat 34 in the mold to accurately locate the nozzle 10 in alignment with the gate 28. The gate insert 32 also has a central bore 36 which tapers smoothly inward from the central bore 22 through the nozzle 10 to the gate 28. While only a single nozzle is illustrated, it will be appreciated in this application the injection molding system normally has several nozzles mounted along the manifold 14 to convey melt to a common cavity 30 as shown in the applicant's U.S. Pat. No. 4,979,892 which issued Dec. 25, 1990. In other applications of the invention, numerous nozzles are mounted in a mold to each convey melt from a manifold or manifolds to a different cavity. Similarly, the mold 20 normally has a number of different plates rather than the unitary structure which is shown for ease of illustration.

The steel manifold 14 is heated by an electric plate heater 38 which is bolted to it, and the nozzle 10 is heated by an electrical heating element 40 which is integrally brazed into it as described in the applicant's U.S. Pat. No. 4,768,283 which issued Sep. 6, 1988. The mold 20 is cooled by pumping cooling water through cooling conduits 42. As is normally the case, the heated manifold 14 and nozzles 10 are separated from the adjacent cooled mold 20 by insulative air spaces 44. The system has a melt passage 46 which branches from a longitudinal bore 48 in the manifold to extend around a valve pin or member 50 received in the bore 22 of each nozzle 10 to the respective gate 28. Pressurized melt received from a molding machine through an inlet (not shown) to the longitudinal bore 48 in the manifold is conveyed by the melt passage 46 to fill the cavity 30 according to an injection cycle which is described in more detail below.

Figure 2:
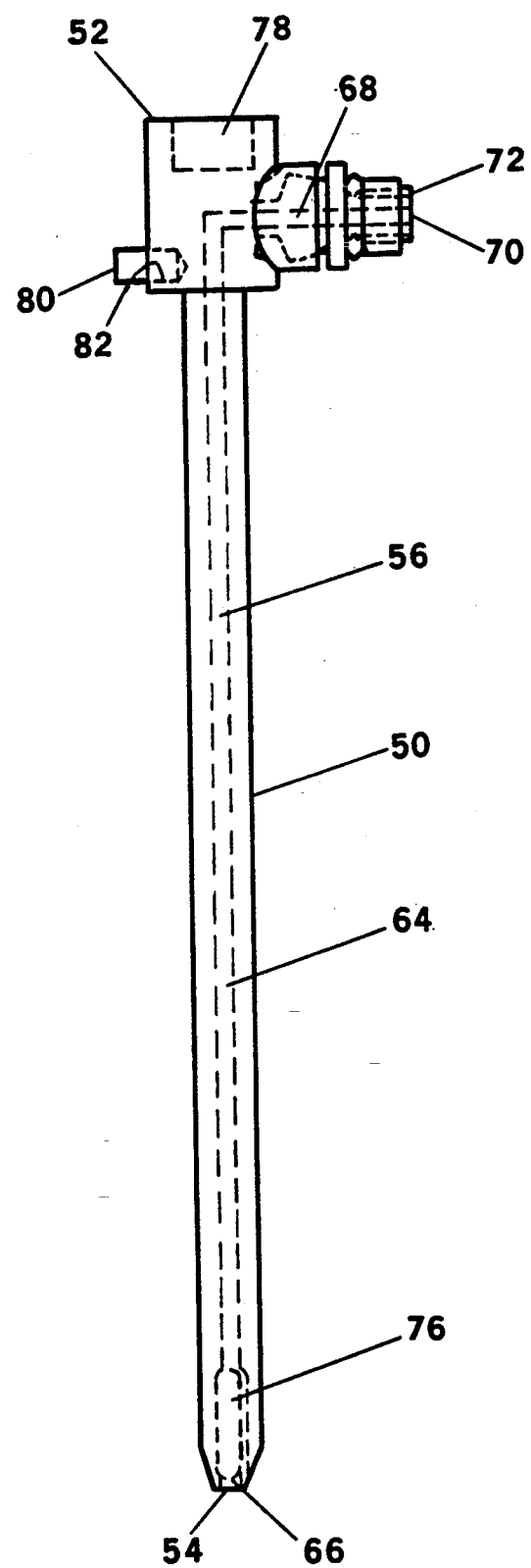
FIG. 2 is a larger view of the valve member seen in FIG. 1.

The flow of melt through each gate 28 is controlled by the elongated valve member 50 which reciprocates in the central bore 22 of the nozzle between a retracted open position and a forward closed position. The elongated valve member 50 has a driven rear end 52 and a forward tip end 54 which is seated in the gate 28 in the forward closed position. As more clearly seen in FIG. 2, the valve member 50 according to the invention also has an electrically insulated heating element 56. In this embodiment, the heating element 56 has a chrome nickel resistance wire extending through a refractory powder insulating material such as magnesium oxide inside a steel casing. The heating element has a longitudinal forward portion 64 which extends to its forward end 66 adjacent the forward end 54 of the valve member, and a rear portion 68 which extends outwardly from the forward portion 64 to its rear end 70 in an external electrical terminal 72. In this embodiment, the external electrical terminal 72 projects laterally outward adjacent the rear end 52 of the valve member 50 to receive a lead wire 74 from an external power source (not shown). The heating element 56 is integrally brazed into the valve member 50 in a vacuum furnace and has a multiple thickness portion 76 adjacent the forward end 54 of the valve member 50. The rear end 52 of the valve member 50 has a threaded bore 78, and a short locating pin 80 projects outwardly from another bore 82 opposite the electrical terminal 72.

Figure 3:
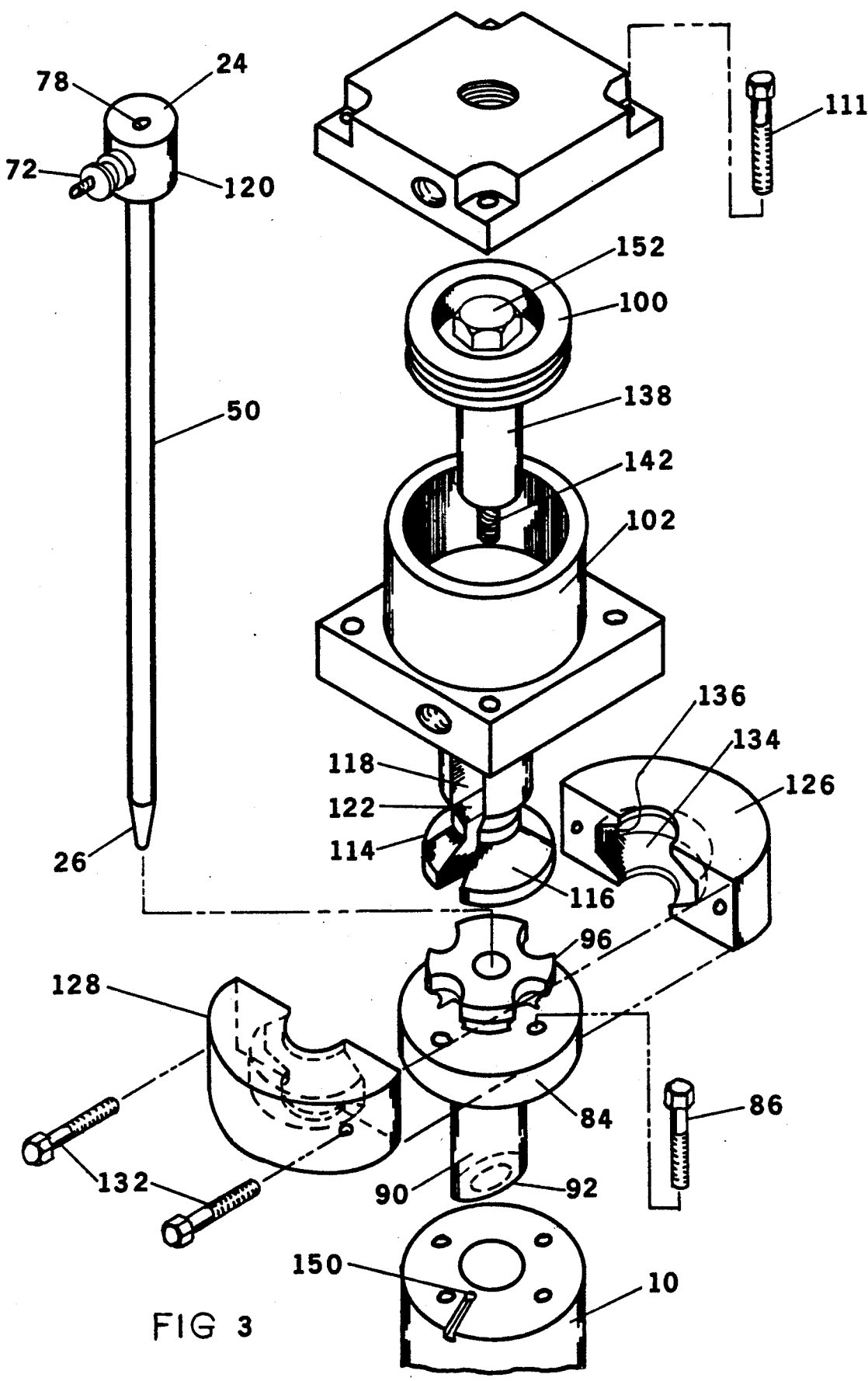
FIG. 3 is an exploded isometric view showing how the actuating mechanism is mounted to engage the rear end of the valve member.

A steel valve bushing 84 is securely fixed to the rear end 24 of the nozzle 10 by bolts 86 and has a central bore 88 through which the valve member 50 extends. As best seen in FIG. 3, the valve bushing 84 has a sealing sleeve portion 90 which fits into the central bore 22 of the nozzle 10 to prevent leakage of the pressurized melt as the valve member 50 reciprocates. The sealing sleeve portion 90 has a diagonal face 92 which redirects the melt flowing in through a lateral portion 94 of the melt passage 46 forward around the valve member 50. The valve bushing 84 also has a rearwardly facing flange portion 96 with a tapered outer surface 98.

The valve member 50 is reciprocated longitudinally between the open and closed positions by actuating mechanism which includes a piston 100 which is mounted in a cylinder 102. In this embodiment, the cylinder 102 is a pneumatic cylinder with external air connectors 104, 106 on opposite sides of the piston 100, but a hydraulic cylinder can be used in other embodiments. The cylinder 102 has a removable cover 108 which is secured to it by bolts 110, and a forwardly extending hollow slotted mounting sleeve 112 which is integrally brazed to it. As can best be seen in FIG. 3, the mounting sleeve 112 has a forwardly facing flange portion 114 with a tapered outer surface 116 which matches the flange portion 96 which faces rearwardly from the connector member 84. The mounting sleeve 112 has a large radial slot 118 extending longitudinally to receive the head 120 of the valve member 50 therein with the electrical terminal 72 extending outward through the slot 118. As can be seen, the slot 118 has a shoulder 122 against which the enlarged head 120 of the valve member abuts to provide a stop when the forward tip end 54 of the valve member 50 is seated in the gate 28 in the forward closed position. The slot 118 also has a smaller longitudinal portion 124 which extends rearwardly to receive the locating pin 80 projecting from the head 120 of the valve member 50 to prevent it rotating as it reciprocates. The cylinder 102 is mounted on the valve bushing 84 with their flange portions 96, 114 abutting. Two halves 126, 128 of a Wedge clamp 130 are positioned to encircle the flange portions 96, 114 and are tightened together by bolts 132. The two halves 126, 128 have tapered inner surfaces 134, 136 which match the tapered surfaces 98, 116 of the flange portions 96, 114. Thus, the wedge clamp 130 securely removably mounts the cylinder 102 in accurate alignment on the valve bushing 84.

The piston 100 has an elongated neck 138 which projects forwardly through an opening 140 in the cylinder 102 to a threaded head 142. The elongated neck extends through a high pressure seal 144 which is retained in position in the cylinder 102 by a snap ring. The head 142 of the neck 138 of the piston 100 is screwed into the threaded bore 78 in the rear end 52 of the valve member 50 to removably secure them together.

During assembly, a thermocouple 148 is inserted through a thermocouple bore 150 to monitor the operating temperature adjacent the forward end 26 of the nozzle 10. After the valve bushing 84 has been bolted in place, the valve member 50 is inserted into the bores 88, 22 of the connector member 84 and the nozzle 10. The seal 144 and piston 100 are mounted in the cylinder 102 to which the mounted sleeve 112 has been integrally brazed. The mounting sleeve 112 is then positioned over the projecting head 120 of the valve member 50 with the external terminal projecting outwardly through the larger slot 118 and the locating pin 80 received in the smaller rearwardly directed portion 12 of the slot. The cylinder is then secured in this position by bolting the two halves 126, 128 of the wedge clamp 130 together over the abutting wedge portions 96, 114. The head 142 of the piston 100 is then screwed tightly into the threaded bore 78 in the rear end 52 of the valve member 50 using a hexagon shaped portion 152 provided on the rear face of the piston 100. Finally, the cylinder cover 108 is fastened in place by bolts 110. Thus, the apparatus has inner parts (valve member 50 and piston 100) which reciprocate inside fixed outer parts (nozzle 10, valve bushing 84 and cylinder 102). As can be seen, provision is made to connect electrical power to the heating element 56 of the moving valve member 50 by having the terminal 72 project outwardly through the slot 118 in the sleeve 112 for mounting the cylinder 102.

In use, the system or apparatus is assembled as shown in FIG. 1 and electrical power is applied to the plate heater 38 and the heating element 40 of each nozzle 10 to heat the manifold 14 and nozzles 10 to a predetermined operating temperature. Pressurized melt from a molding machine (not shown) is injected into the melt passage 46 in conjunction with the application of pneumatic pressure through connectors 104, 106 to each cylinder 102 according to a predetermined operating cycle. Electrical power to the heating element 56 of each valve member 50 is also controlled according to the operating cycle as described below to provide additional heat to the valve member 50.

After pneumatic pressure is applied to retract the valve members 50 to the open position, injection pressure is applied to inject melt through the open position and injection pressure is applied to inject melt through the melt passage 46 to fill the cavities 30. After the cavities are full, injection pressure is held momentarily to pack and pneumatic pressure is then applied to the cylinders 102 to drive the valve members 50 forward to the closed position. Electrical power is switched on to the heating elements 56 in the valve members 50 which supplies heat to each valve member 50 and ensures that the forward tip end 54 seats fully in the gate 28 flush with the cavity to minimize the gate mark. As the valve member 50 closes, the additional heat provided by the heating element 56, particularly by the multiple thickness portion 76, enables the forward end 54 to melt or burn through the layer of material which has solidified around the gate 28 on the cooled mold. After the gates 28 are closed, power to the heating elements 56 is switched off and injection pressure is released. The mold 20 is then opened along the parting line 154 to eject the molded product. After ejection, the mold is closed and electrical power is reapplied to the heating elements 56 in the valve members 50. Pneumatic pressure is applied to withdraw the valve members to the open position and injection pressure is reapplied to refill the cavities 30. The cycle is repeated continuously with a frequency dependent on the size of the cavities 30 and type of material being molded.

While the description of the injection molding apparatus having a valve member with an integral heating element has been given with respect to a preferred embodiment, it will be evident that various modifications are possible without departing from the scope of the invention as understood by those skilled in the art and as defined in the following claims. For instance, other manifold and actuating mechanisms can be used in which each valve member extends rearwardly from the nozzle so access for the electrical lead 74 to the terminal 72 is provided rearwardly of the nozzle 10 in both the open and closed positions.

The embodiments of the invention in which an exclusive property or privilege is claimed are defined as follows:

1. In a valve gated injection molding apparatus having a heated nozzle received in a mold, the nozzle having a forward end, a rear end and a bore which extends longitudinally in alignment with a gate which extends through the mold to a cavity, an elongated valve member with a forward end and a driven rear end, the valve member being received in the bore in the nozzle and driven by an actuating mechanism to reciprocate said valve member between a retracted open position and a forward closed position wherein the forward end of the valve member is seated in the gate, the actuating mechanism including a piston which is mounted in a cylinder and operatively engages the rear end of the valve member, the nozzle having a melt passage which joins the bore and extends in the bore around the valve member to the gate, the improvement wherein;

the valve member has an integral electrically insulated heating element with a forward end and a rear end, the heating element having a longitudinal forward portion and a rear portion, the longitudinal forward portion of the heating element extending centrally in the valve member to the forward end adjacent the forward end of the valve member, the rear portion of the heating element extending outwardly from the forward portion to an external electrical terminal adjacent the rear end of the valve member.

2. The valve gated injection molding apparatus as claimed in claim 1 wherein the valve member extends rearwardly from the nozzle whereby the external electrical terminal of the valve member is rearward of the nozzle in both the open and closed positions.

3. The valve gated injection molding apparatus as claimed in claim 2 wherein the piston has an elongated neck which projects forwardly through an opening in the cylinder to engage the rear end of the valve member.

4. The valve gated injection molding apparatus as claimed in claim 3 wherein the rear end of the valve member has a threaded bore and the neck of the piston has a threaded head which is screwed into the threaded bore in the rear end of the valve member.

5. The valve gated injection molding apparatus as claimed in claim 4 wherein the cylinder is mounted on a forwardly extending mounting sleeve having a longitudinally extending radial slot therein, and the electrical terminal of the valve member projects outwardly through the slot to receive an external lead.

6. The valve gated injection molding apparatus as claimed in claim 5 wherein the slot in the mounting sleeve has a second longitudinally extending portion therein, and the valve member has a locating pin which extends outwardly into the second portion to angularly locate the reciprocating valve member.

* * * * *